(12) United States Patent
Yuet et al.

(10) Patent No.: US 8,019,514 B2
(45) Date of Patent: Sep. 13, 2011

(54) AUTOMATED ROLLOVER PREVENTION SYSTEM

(75) Inventors: Fu Pei Yuet, Peoria, IL (US); Jamie Shults, Peoria, IL (US); Jean-Jacques Clar, Dunlap, IL (US); Kenneth L. Stratton, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 705 days.

(21) Appl. No.: 11/711,791

(22) Filed: Feb. 28, 2007

(65) Prior Publication Data

US 2008/0208416 A1    Aug. 28, 2008

(51) Int. Cl.
*G06F 19/00* (2011.01)

(52) U.S. Cl. .......... 701/50; 701/1; 701/29; 701/45; 701/70; 701/124; 340/438; 340/440

(58) Field of Classification Search ........... 701/2, 50, 701/23, 26, 37, 48; 180/271, 282
See application file for complete search history.

(56) References Cited

U.S. PATENT DOCUMENTS

| | | | |
|---|---|---|---|
| 4,709,773 A | 12/1987 | Clement et al. | |
| 5,825,284 A * | 10/1998 | Dunwoody et al. | 340/440 |
| 6,397,133 B1 * | 5/2002 | van der Pol et al. | 701/37 |
| 6,498,976 B1 * | 12/2002 | Ehlbeck et al. | 701/70 |
| 6,529,821 B2 * | 3/2003 | Tomasi et al. | 701/202 |
| 6,556,908 B1 * | 4/2003 | Lu et al. | 701/38 |
| 6,741,922 B2 | 5/2004 | Holler | |
| 6,782,644 B2 | 8/2004 | Fujishima et al. | |
| 6,954,140 B2 | 10/2005 | Holler | |
| 6,955,324 B2 | 10/2005 | Tanielian | |
| 7,065,440 B2 | 6/2006 | Aral et al. | |
| 7,085,637 B2 * | 8/2006 | Breed et al. | 701/38 |
| 7,164,974 B2 * | 1/2007 | Ono et al. | 701/1 |
| 7,272,474 B1 * | 9/2007 | Stentz et al. | 701/26 |
| 7,526,376 B2 * | 4/2009 | Huang et al. | 701/124 |
| 7,539,557 B2 * | 5/2009 | Yamauchi | 700/245 |
| 7,568,547 B2 * | 8/2009 | Yamada et al. | 180/306 |
| 7,715,965 B2 * | 5/2010 | Messih et al. | 701/45 |
| 2003/0023359 A1 * | 1/2003 | Kueblbeck et al. | 701/45 |
| 2004/0012250 A1 | 1/2004 | Kuno et al. | |
| 2004/0102894 A1 * | 5/2004 | Holler | 701/124 |
| 2005/0049778 A1 * | 3/2005 | Ono et al. | 701/124 |
| 2005/0060069 A1 * | 3/2005 | Breed et al. | 701/29 |
| 2006/0020385 A1 | 1/2006 | Kakinuma | |
| 2006/0085111 A1 | 4/2006 | Kojima | |
| 2006/0089771 A1 * | 4/2006 | Messih et al. | 701/45 |
| 2006/0243514 A1 | 11/2006 | Oohashi | |
| 2007/0017727 A1 * | 1/2007 | Messih et al. | 180/282 |
| 2008/0027591 A1 * | 1/2008 | Lenser et al. | 701/2 |
| 2008/0059015 A1 * | 3/2008 | Whittaker et al. | 701/23 |
| 2008/0133101 A1 * | 6/2008 | Woywod et al. | 701/83 |

(Continued)

FOREIGN PATENT DOCUMENTS

DE    37 14 111    12/1988

(Continued)

*Primary Examiner* — Khoi Tran
*Assistant Examiner* — Jonathan L Sample
(74) *Attorney, Agent, or Firm* — Finnegan, Henderson, Farabow, Garrett & Dunner LLP

(57) ABSTRACT

A control system for a machine is disclosed. The control system may have at least one sensor configured to generate a signal indicative of an inclination of the machine. The control system may also have a controller in communication with the at least one sensor. The controller may be configured to stop operation of the machine in response to the signal.

26 Claims, 4 Drawing Sheets

U.S. PATENT DOCUMENTS

| | | | |
|---|---|---|---|
| 2008/0162004 A1* | 7/2008 | Price et al. | 701/50 |
| 2008/0180523 A1* | 7/2008 | Stratton et al. | 348/114 |
| 2008/0189003 A1* | 8/2008 | Gillula | 701/24 |
| 2008/0208415 A1* | 8/2008 | Vik | 701/50 |
| 2008/0208416 A1* | 8/2008 | Yuet et al. | 701/50 |
| 2009/0088979 A1* | 4/2009 | Koch | 701/224 |
| 2009/0198400 A1* | 8/2009 | Allard et al. | 701/23 |

FOREIGN PATENT DOCUMENTS

| | | |
|---|---|---|
| EP | 0408033 | 1/1991 |
| JP | 09128043 A | 5/1997 |
| JP | 10-151963 | 6/1998 |
| JP | 2000172989 A | 6/2000 |

\* cited by examiner

AUTOMATED ROLLOVER PREVENTION SYSTEM

TECHNICAL FIELD

The present disclosure relates generally to a rollover protection system, and, more particularly, to an automated rollover protection system for remotely and autonomously controlled machines.

BACKGROUND

Machines such as, for example, dozers, motor graders, wheel loaders, and other types of heavy equipment are used to perform a variety of tasks. The completion of some of these tasks requires operation on or near steep inclines that, if inappropriately traversed by a machine, have the potential to roll the machine over, resulting in equipment damage and possible injury to the operator. When under the direct control of a human operator, the likelihood of rollover may be estimated by the operator and appropriate avoidance measures manually implemented. However, in some situations, rollover may be difficult for the operator to anticipate and, without suitable automated safety measures in place, rollover may be unavoidable. This rollover potential may be even greater when the machine is remotely or autonomously controlled.

One automated safety measure intended to prevent rollover is described in U.S. Pat. No. 6,954,140 (the '140 patent) issued to Holler on Oct. 11, 2005. The '140 patent describes a rollover prevention device suitable for an on-highway vehicle having a high center of gravity, where the vehicle has the potential to rollover when cornering at high vehicle speeds. The device has an electronic control unit that receives signals from wheel velocity, engine revolution, and engine load sensors. Based on these signals, the electronic control module calculates lateral acceleration, wheel slip differences, and drive torque. When the calculated values indicate the likelihood of rollover, the electronic control unit alerts the operator to potentially dangerous driving conditions and automatically reduces the velocity of the vehicle through the application of vehicle brakes. By reducing the velocity, the vehicle's likelihood of rollover may also be reduced.

Although the device of the '140 patent may minimize the likelihood of vehicle rollover caused by high speed cornering, it may do little to prevent rollover from occurring as a result of the vehicle traversing steep terrain. That is, because the device of the '140 patent initiates countermeasures based only on wheel and engine conditions, no preventative measures may be implemented when the wheel and engine conditions fall within normal operating ranges, even though the likelihood of rollover from excessive inclines may still be great. And, because the device of the '140 patent only slows the travel speed of the vehicle, which is not a major factor in rollovers caused by traversing excessive inclines, rollover may still be possible, even if properly detected.

The disclosed system is directed to overcoming one or more of the problems set forth above.

SUMMARY OF THE INVENTION

In one aspect, the present disclosure is directed to a control system for a machine. The control system may include at least one sensor configured to generate a signal indicative of machine inclination. The control system may also include a controller in communication with the at least one sensor. The controller may be configured to stop operation of the machine in response to the signal.

In yet another aspect, the present disclosure is directed to a method of preventing machine rollover. The method may include detecting machine inclination. The method may also include determining a rollover risk value based on the machine inclination, and stopping machine operation in response to the rollover risk value.

DETAILED DESCRIPTION

Figure 1:
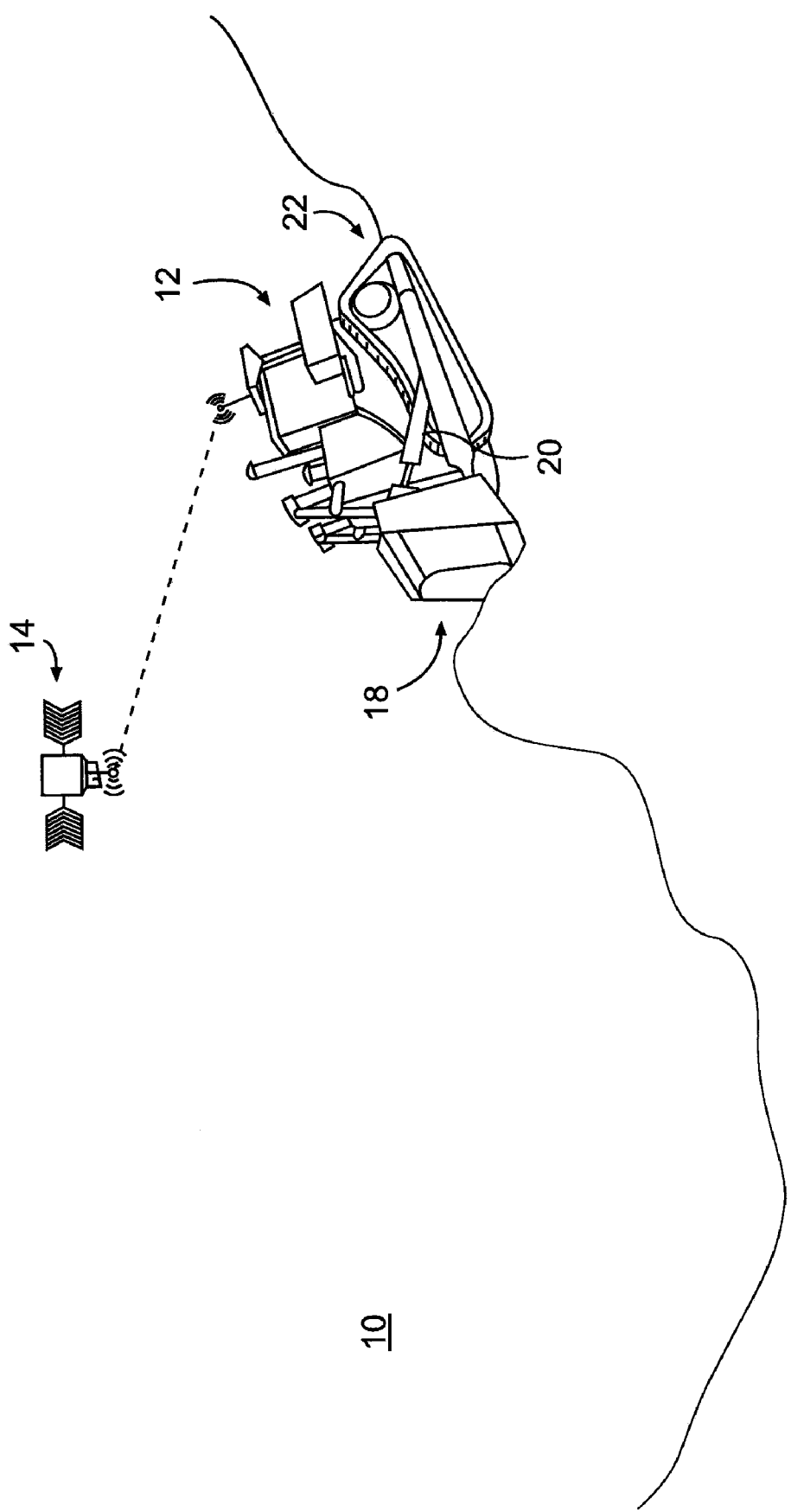
FIG. 1 is a pictorial illustration of an exemplary disclosed machine operating at a worksite.

FIG. 1 illustrates a worksite 10 with an exemplary machine 12 performing a predetermined task. Worksite 10 may include, for example, a mine site, a landfill, a quarry, a construction site, or any other type of worksite known in the art. The predetermined task may be associated with altering the current geography at worksite 10. For example, the predetermined task may include a grading operation, a leveling operation, a bulk material removal operation, or any other type of operation that results in alteration of the current geography at worksite 10. As machine 12 moves about worksite 10, a satellite 14 or other tracking device may communicate with an onboard control system 16 to monitor the movement of machine 12.

Machine 12 may embody a mobile machine that performs some type of operation associated with an industry such as mining, construction, farming, or any other industry known in the art. For example, machine 12 may embody an earth moving machine such as a dozer having a blade or other work implement 18 movable by way of one or more motors or cylinders 20. Machine 12 may also include one more traction devices 22, which may function to steer and/or propel machine 12.

Figure 2:
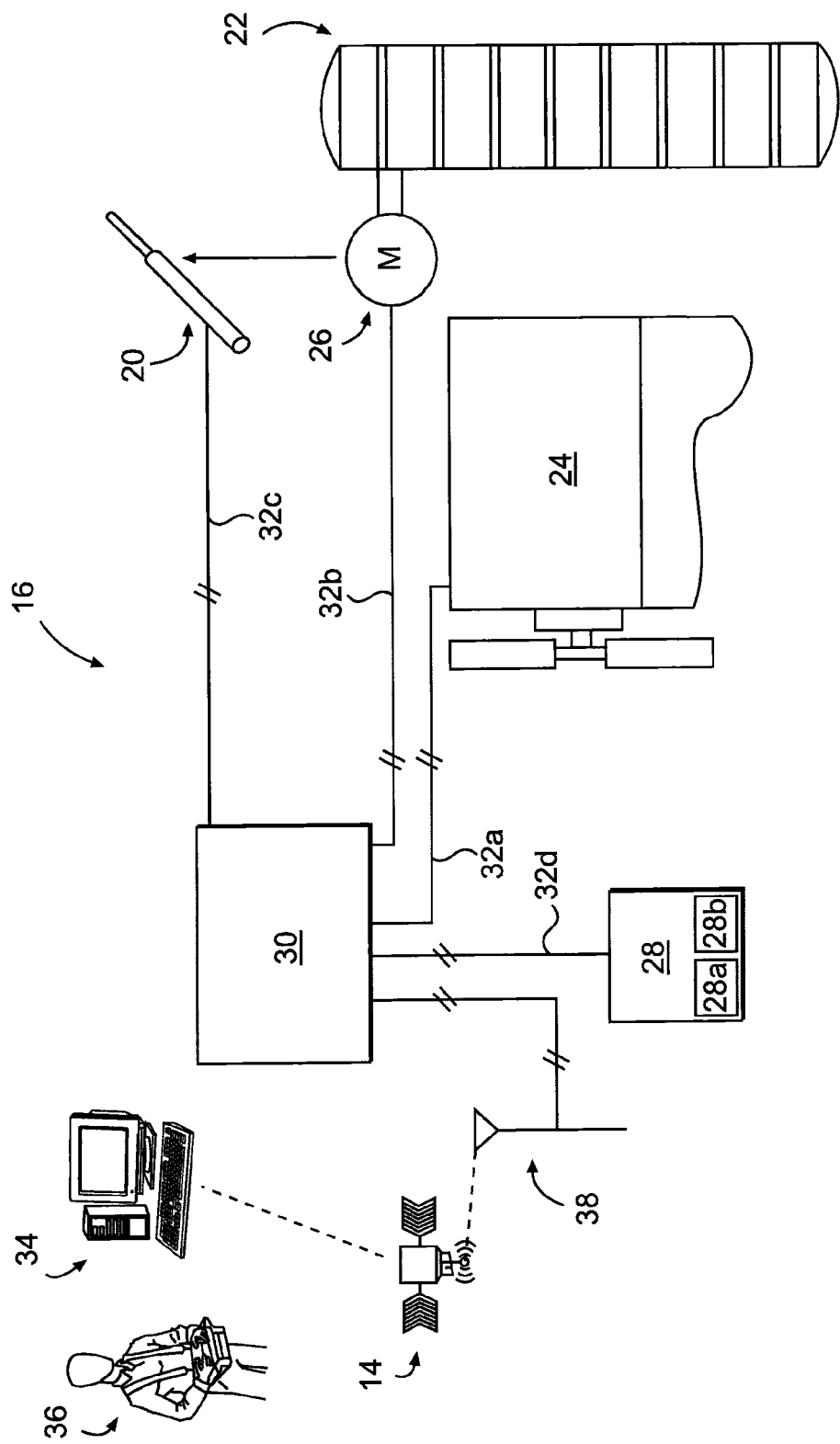
FIG. 2 is a diagrammatic illustration of an exemplary disclosed control system for use with the machine of FIG. 1.

As best illustrated in FIG. 2, control system 16 may include various components that interact to affect operation of machine 12 in response to commands received from satellite 14. In particular, control system 16 may include a power source 24, a means 26 for driving cylinders 20 and traction devices 22 (only one shown), a data module 28, and a controller 30. Controller 30 may be communicatively coupled to power source 24, driving means 26, cylinders 20, traction devices 22, and data module 28 via communication links 32a, 32b, 32c, and 32d, respectively.

Power source 24 may include an engine, such as, for example, a diesel engine, a gasoline engine, a gaseous fuel powered engine such as a natural gas engine, or any other type of engine apparent to one skilled in the art. Power source 24 may alternatively include a non-combustion source of power such as a fuel cell, a power storage device, an electric motor, or other similar mechanism. Power source 24 may be connected to drive means 26 via a direct mechanical coupling (e.g., transmission), an electric circuit, a hydraulic circuit, or in any other suitable manner.

Driving means 26 may include a pump such as a variable or fixed displacement hydraulic pump drivably connected to power source 24. Driving means 26 may produce a stream of pressurized fluid directed to cylinders 20 and/or to a motor associated with traction device 22 to drive the motion thereof. Alternatively, driving means 26 may embody a generator configured to produce an electrical current used to drive any one or all of cylinders 20 and traction device 22, a pneumatic pumping device, a mechanical transmission, or any other means or combination of means for driving cylinders 20 and traction device 22.

Data module 28 may include a plurality of sensing devices 28a-b distributed throughout machine 12 to gather real-time data from various components and systems thereof, and/or concerning various operational aspects thereof, and communicate corresponding signals to controller 30. For example, sensing devices may be used to gather information concerning operation of power source 24, driving means 26, traction devices 22, and/or implement 18. Sensing devices 28a-b may also be used to gather real-time data regarding machine positioning, heading, movement, and/or loading. Sensing devices 28a-b may also be used to gather real-time data concerning worksite 10, such as, for example, live video feed from one or more cameras mounted on machine 12. It is to be appreciated that data module 28 may include additional sensors to gather real-time data concerning any other machine and/or worksite operational parameters known in the art, if desired.

For example, a position locating device 28a may gather real-time data concerning machine position, orientation (a machine heading), and/or ground speed information. In one aspect, locating device 28a may include a global positioning system (GPS) comprising one or more GPS antennae disposed at one or more locations about machine 10 (e.g., at the front and rear of machine 10). The GPS antenna may receive and analyze high-frequency, low-power electromagnetic signals from one or more global positioning satellites. Based on the trajectories of the one or more signals, and/or information contained therein, locating device 28a may determine a location of itself relative to the satellites, and thus, a 3-D global position and orientation of machine 12 may be determined by way of triangulation. Signals indicative of this position may then be communicated from locating device 28a to controller 30 via communication link 32d. Further, by repeatedly sampling machine positions, a real-time machine ground speed may be determined based on distances between samples and time indices associated therewith, and/or a time between samples. Alternatively, locating device 28 may embody an Inertial Reference Unit (IRU), a component of a local tracking system, or any other known locating device that receives or determines positional information associated with machine 12.

In a further aspect, locating device 28a may gather data to determine a real-time inclination of machine 12 on the surface of worksite 10. For example, locating device 28a may include three (or more) GPS antennae receivers disposed about machine 10 in known locations, and an inclination of machine 10 may be determined by comparing an orientation of a surface defined by the respective positions of the three (or more) receivers relative to a gravity vector. Further, a real-time machine heading may be determined by comparing known locations of each of the receivers on machine 12 with determined global positions thereof. Alternatively or additionally, locating device 28a may include conventional inclination electronics disposed about machine 10. These electronics may include, for example, electrodes disposed within a glass vial and submerged in an electrically-conductive fluid. As machine inclination changes, submersion depths of the electrodes may change, and electrical resistances of respective paths between the electrodes may vary accordingly. As such, a real-time inclination of machine 12 may be defined with respect to measured resistances of the paths. Device 28a may further include an accelerometer configured to measure a real-time rate of machine inclination. In one example, a real-time inclination and/or inclination rate of machine 12 may be determined in both a travel direction (pitch), and a direction substantially transverse (e.g., perpendicular) to the travel direction (roll). It is to be appreciated that other inclination sensors known in the art may be used alternatively or additionally. Signals indicative of the determined machine inclination and/or position may be communicated by locating device 28a to controller 30 via communication link 32d.

Data module 28 may also include machine load sensing devices 28b to gather real-time loading information about machine 12. In one embodiment, devices 28b may comprise a plurality of strain gauges or pressure gauges disposed about machine 12 to detect load distribution throughout machine 12. For example, devices 28b may include four strain gauges, each associated with a suspension point at which traction devices 22 engage an undercarriage of machine 12. In one aspect, sensing devices 28b may each measure a load magnitude (e.g., a mass, weight, and/or force) applied at the respective suspension points in a direction substantially orthogonal to a machine inclination surface. Additionally, devices 28b may each measure a load magnitude and direction applied at the respective suspension points in directions substantially parallel to the machine inclination surface. Alternatively or additionally, devices 28b may measure a load magnitude applied to each of the suspension points along a gravity vector direction. Signals indicative of machine loading may be communicated from devices 28b to controller 30 by way of communication link 32d. It is to be appreciated that the measured loads may reflect a portion of the mass of machine 12 itself, as well as any material contained therein. It is to be appreciated that devices 28b may alternatively or additionally be provided in other locations about machine 12, if desired. Other methods of load sensing known in the art may be used alternatively or additionally.

Devices 28a and 28b may also track gathered machine travel data as machine 12 moves about worksite 10. Particularly, the real-time information gathered by devices 28a and 28b may be stored in matrix form within the memory of controller 30 and used to generate and continuously update a 3-D machine travel path history. In one aspect, the history may include a plurality of time-indexed machine position samples. For example, each sample may include coordinates defining a global position of machine 12 with respect to worksite 10, a travel direction of machine 12 at the position (e.g., heading), and/or an inclination of machine 12 at the position (e.g., a pitch angle and a roll angle with respect to the horizon).

In one aspect, the real-time information gathered by module 28 may be used to provide a visual representation of worksite 12, such as, for example, a real worksite environment, a simulated 3-D worksite environment, and/or a combination thereof to an operator at a remotely-located user interface 34 for remote control of machine 12. Interface 34 may embody, for example, a machine simulator, a mainframe, a work station, a laptop, a desktop, a personal digital assistant, or any other computing system known in the art. Interface 34 may include input devices, such as, for example, keyboards, keypads, touch-screen monitors, touch pads, buttons, joysticks, levers, and/or any other such devices for receiving input commands from an operator 36. Interface 34 may include also include components such as, for example, memory, one or more secondary data storage devices, microprocessor(s), or any other components used to run an application.

In some instances, interface 34 may communicate with a predetermined worksite terrain map (not shown) to facilitate simulation of the worksite environment. The terrain map may be, for example, a predetermined schematic CAD rendering of worksite 10, or the like, containing coordinate data in matrix form defining the surface terrain of worksite 10 at a plurality of locations. The terrain may also include other information about worksite 10, such as, for example, locations of above- and/or below-ground obstacles or fixtures, and/or physical properties of the material comprising the worksite terrain. Alternatively, the terrain map may be generated by way of satellite imagery equipment known in the art.

Controller 30 may include means for monitoring, recording, storing, indexing, processing, and/or communicating machine data to facilitate remote and/or autonomous control of the machine 12. These means may include, for example, a memory, one or more data storage devices, a central processing unit (e.g., microprocessor), or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

For example, controller 30 may include means for communicating with interface 34. In one aspect, controller 30 may be associated with an antenna 38, and/or other hardware and/or software that enables transmitting and receiving data through a direct data link (not shown) or a wireless communication link. The wireless communications may include satellite, cellular, infrared, radio, microwave, or any other type of wireless electromagnetic communications that enable controller 30 to exchange information. In one aspect, controller 30 may communicate the data to satellite 14, which may then relay the communications directly to the interface 34. Alternatively, the data may be communicated by satellite 14 to an intermediary, such as a server (not show), which may appropriately package the data for transmission to interface 34. Similarly, interface 34 may communicate operator input commands to satellite 14, which may relay the communications to controller 30 for remote operator control of machine 12.

In one embodiment, controller 30 may automatically affect machine movement and/or other machine functions in response to the received operator input commands. Additionally, controller 30 may implement a disclosed rollover protection algorithm during machine control, which will be further discussed below. Controller 30 may communicate with power source 24, driving means 26, with various hydraulic control valves associated with cylinders 20, with transmission devices, and other actuation components of machine 12 to initiate, modify, or halt operation of traction devices 22 and/or implement 18, as necessary or desired. For example, controller 30 may responsively vary fuel flow, air-flow, ignition rate, electrical currents and voltage levels, and/or otherwise control an output speed and/or torque of power source 24. Controller 30 may also responsively vary electrical currents and/or voltage levels, fluid and/or gas pressure, and/or pump displacement to control a torque-to-speed output ratio of driving means 26 or otherwise vary an output speed, direction, steering angle of traction devices 22, and/or an extension length of cylinders 20. It is to be appreciated that any additional machine functions known in the art may similarly be controlled, if desired.

Controller 30 may determine rollover risk by comparing real-time machine inclination to an inclination threshold. The threshold may represent a maximum pitch and/or roll inclination angle machine 12 may sustain without undue risk of rollover. The inclination threshold may be based, in part, on known specifications of machine 12, such as, for example, wheelbase (i.e., distance between front and rear engagement surfaces of traction devices), a distance between engagements surfaces of left and right traction devices, height, center of mass, etc. The threshold may also be based on data gathered by devices 28a and 28b, such as, for example, machine inclination, heading, and/or loading data.

In a first exemplary embodiment, controller 30 may establish a fixed inclination threshold based on known machine specifications, and irrespective of machine loading conditions (e.g., 35 degrees pitch and 45 degrees roll). The threshold may be stored in the memory, secondary storage, and/or microprocessors of controller 30 as hardware, software, and/or firmware for reference. In this embodiment, the threshold may established such that when traversing an incline below the threshold, the likelihood of machine 12 rolling over may be minimal, regardless of loading conditions.

In another exemplary embodiment, controller 30 may dynamically vary the inclination threshold based on machine loading conditions encountered during operation. It is to be appreciated that under some circumstances, the machine's susceptibility to rollover may increase as loading increases. For example, adding a load of material to the bed of a dump truck may effectively raise the machine's center of mass, and, therefore, make machine 12 more vulnerable to rollover at a given inclination angle. As such, controller 30 may include predetermined, known thresholds for machine 12 in both an unloaded and fully-loaded state (e.g., 35 degrees and 25 degrees roll, and 45 degrees and 35 degrees pitch, respectively) stored in the memory, secondary storage and/or microprocessor. During operation, controller 30 may continually analyze the real-time signals received from sensing devices 28a and 28b to determine a real-time loading condition of machine 12. Controller 30 may then determine the real-time load as a percentage of a known maximum capacity load for machine 12, and responsively adjust the threshold between the known unloaded and fully-loaded thresholds based on the percentage.

In still another exemplary embodiment, controller 30 may dynamically vary the inclination threshold based on a calculated center of mass of machine 12. It is to be appreciated that the location of the machine's center of mass may indicate a susceptibility to rollover at a given pitch and/or roll inclination angle. As such, controller 30 may make real-time center of mass calculations as machine 12 travels about worksite 10 and loading conditions change. In one aspect, controller 30 may dynamically calculate a real-time center-of-mass of machine 12 based on the loading signals received from sensing devices 28b. Sensing devices 28b may have known positions relative to one another and stored in the memory, secondary storage, and/or microprocessor of controller 30. As such, controller 3 may calculate a real-time center of mass about an inclination surface of machine 12 by, for example, biasing the load components measured by each sensing device 28b according to the sensing device's respective vector position relative to a known reference point. The resulting load vectors may then be summed, and divided by a total load (i.e., the cumulative, total load measured by devices 28b), giving a vector defining the machine's real-time center of mass with respect to the reference point. For example, the real-time center of mass may be represented by Eq. 1 below:

$$R = \frac{1}{M} \sum m_i r_i, \qquad \text{Eq. 1}$$

wherein mi is the mass measured at the ith sensing device 28$b$, ri is a vector defining the position of the ith sensing device relative to the reference point, and M is the sum of the masses measured by each of the i sensing devices 28$b$.

Subsequently, controller 30 may compare the calculated real-time center of mass with a known, unloaded center of mass of machine 12. It is to be appreciated that a material deviation from the unloaded center of mass may indicate a higher risk of rollover in a particular direction. Specifically, if machine 12 is loaded in such a manner that the center of mass deviates substantially from the known, unloaded center of mass, the load may be sufficiently massive and/or displaced to cause machine rollover at certain pitch and/or roll angles lower than the previously established unloaded threshold values. As such, controller 30 may determine a real-time magnitude and/or direction of deviation in the machine's center of mass from the unloaded center of mass, and set an appropriate inclination threshold. Continuing with the example discussed above, if, for example, the center of mass deviates toward a right side and front end of machine 12, controller 30 may adjust the inclination threshold such that a right roll threshold is reduced from 35 degrees to about 25 degrees, and a pitch forward threshold is reduced from 45 degrees to about 35 degrees. Conversely, controller 30 may increase the roll left and pitch backward thresholds, as the load may be acting as a counterweight to pitch and/or roll in these directions. In one aspect, the amount in which controller 30 may adjust the threshold may be proportional to a real-time percent deviation of the machine's center of mass from the unloaded position.

The center of mass calculation described above may be advantageous in machines including movable implements 18, wherein a position of the implement may have a material effect on the location of the machine's center of mass. For example, if machine 12 is a backhoe including a linkage system and implement 18 fully pivoted to a left side of machine 12, controller 30 may calculate a deviation to the left in the machine's center of mass. Therefore, controller 30 may adjust the threshold such that a greater roll right angle is permitted than roll left angle. Similarly, this center of mass method may also be advantageous when environmental conditions encountered on worksite 10, such as, for example, bumps or potholes in the machine travel path cause a load contained within implement 18 to shift (e.g., from right to left), and therefore, materially change the machine's center of mass location.

Alternatively or additionally, controller 30 may set an inclination rate threshold (e.g., pitch rate and/or roll rate). It is to be appreciated that the inclination rate of machine 12 at any given time may indicate a propensity of machine 12 to roll over, as the center of mass of machine 12, in motion, may generate a moment of inertia in the direction of inclination. As the inclination rate of machine 12 suddenly begins to decrease, the generated moment of inertia may cause an overshoot that may affect rollover if the rate is too great. For example, if machine 12 is traveling along terrain at a speed causing it to roll from 0 degrees to 25 degrees in 1 second and then come to a stop (i.e., a large roll in a short period of time), the moment of inertia generated thereby may be large enough to cause machine rollover, even though a 25-degree inclination may be insufficient to affect rollover under other circumstances, such as, for example, when machine 12 is at rest on a 25-degree incline. Therefore, based on known specifications of machine 12, including center of mass thereof, an inclination rate threshold may be stored in the memory, secondary storage, and/or microprocessors of controller 30 as hardware, software, and/or firmware for reference. It is to be appreciated that the inclination rate threshold may be fixed and/or varied based on loading conditions, as discussed above in connection with the inclination threshold. As such, controller 30 may continually sample the signals provided by devices 28$a$ in order to detect a real-time rate of rate of inclination for comparison with the threshold.

After establishing the inclination threshold and/or inclination rate threshold, controller 30 may assign various ranges of inclination angles and/or inclination rates to specific rollover risk values, which may be communicated to the operator for acknowledgment. For example, as discussed above, machine 12 may have an inclination threshold of 45 degrees pitch and 35 degrees roll. In other words, a pitch angle greater than 45 degrees and/or a roll angle greater than 35 degrees may pose high rollover risk for machine 12. As such, controller 30 may assign a "high" rollover risk value to ranges of 35 degrees to 45 degrees pitch and 25 degrees to 35 degrees roll. Other rollover risk values may be similarly assigned. For example, controller 30 may assign a "moderate" rollover risk value to ranges of 25 degrees to 35 degrees pitch and 15 degrees to 25 degrees roll. Likewise, controller 30 may assign ranges of 0 degrees to 25 degrees pitch and 0 degrees to 15 degrees roll to a "low" rollover risk value. In this manner, controller 30 may determine several degrees of real-time rollover risk based on inclination.

Similarly, machine 12 may have an inclination rate threshold of 15 degrees per second, as mentioned above. In other words, an inclination rate of greater than 15 degrees per second may pose a high risk of rollover. As such, controller 30 may assign a "high" rollover risk value to a range of 10 degrees per second to 15 degrees per second. Other inclination rates may be similarly assigned. For example, controller 30 may assign a "moderate" and "low" rollover risk value to ranges of 5 degrees per second to 10 degrees per second and 0 degrees per second to 5 degrees per second, respectively. In this manner, controller 30 may determine several degrees of real-time rollover risk based on inclination rate.

As discussed above in connection with the thresholds, these rollover risk values may be calculated based on known machine specifications and/or current loading conditions. Alternatively, the values may be fixed and stored in the memory, secondary storage, and/or microprocessors of controller 30 as hardware software and/or firmware for reference. In one exemplary embodiment, possible rollover risk values may comprise three tiers, such as "low", "moderate", and "high", each associated with a range of machine pitch and/or roll inclination angles and/or rates. However, it is to be appreciated that greater or fewer tiers, or other means may be used to indicate degrees of rollover risk, if desired.

During operation, controller 30 may store a respective rollover risk value for each machine position sample (discussed above). In other words, each sampled risk value may be indexed according to its corresponding position. In this manner, controller 30 may recall the risk values contained in the machine travel history when implementing the disclosed rollover prevention algorithm, which will be further discussed below.

Figure 4:
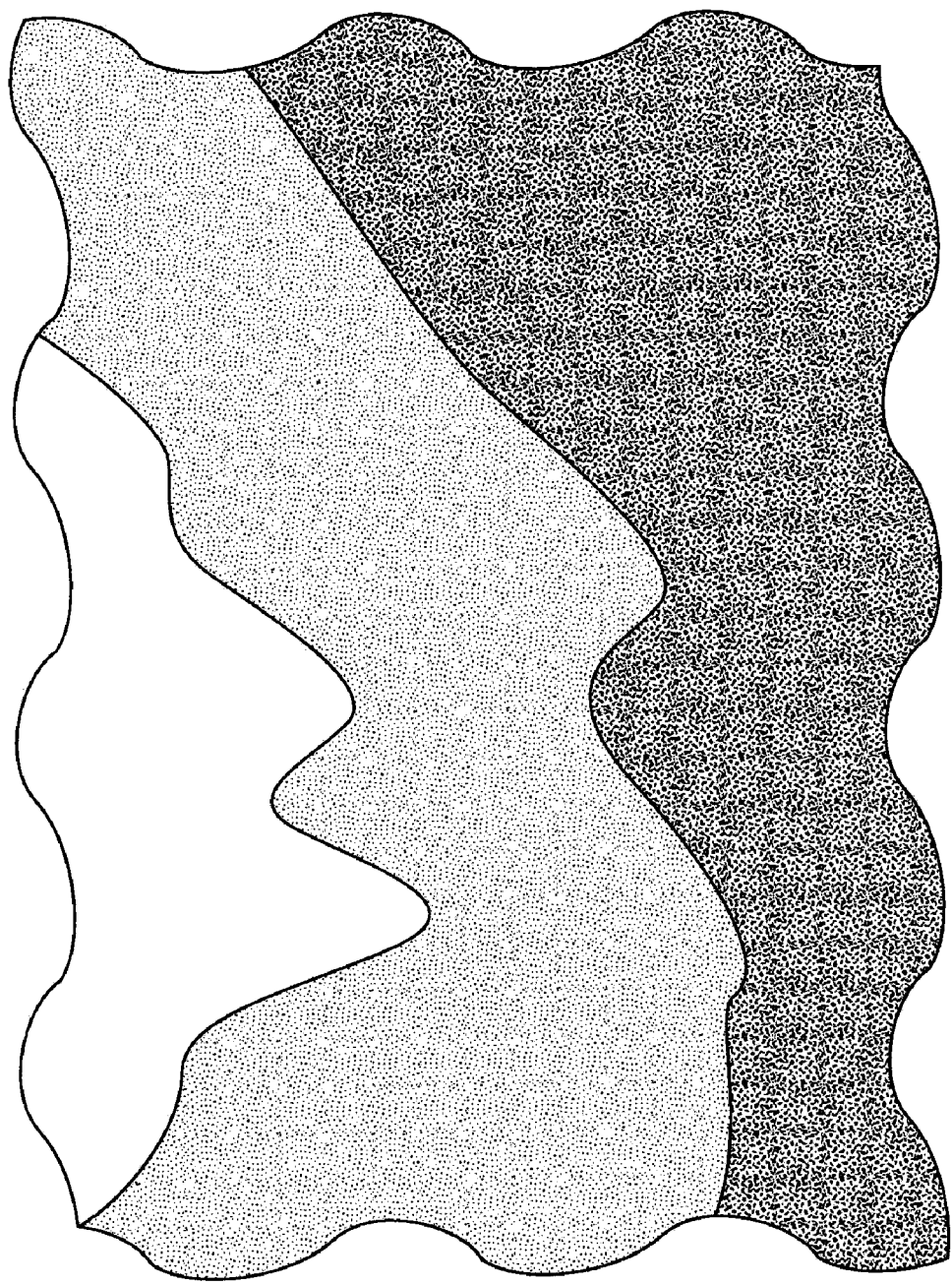
FIG. 4 is an illustration of a map showing a determined rollover risk for different locations within an area that a machine has tracked.

In another aspect, controller 30 may warn an operator 36 of machine 12 of rollover risk by, for example, displaying a present rollover risk value (e.g., low, moderate, and/or high) on a monitor associated with user interface 34. In another aspect, controller 30 may make surface terrain contour measurements from coordinates contained in the terrain map, and indicate portions of the terrain having slope within respective ranges defined by each of the rollover risk tiers mentioned above. For example, terrain having slopes corresponding to a high, moderate, and/or low rollover risk may be visually indicated by user interface 34 in a red, yellow, and/or green color, respectively. FIG. 4 shows an exemplary map with graphical indications of areas having high, moderate, and low rollover risk. Alternatively, controller 30 may provide audible rollover warnings, or any other type of warning known in the art.

Further, controller 30 may autonomously halt machine operation in response to a present rollover risk value. For example, upon receiving signals from devices 28a and 28b indicating a high rollover risk value for a given machine position sample, controller 30 may autonomously halt machine travel by communicating signals to driving means 26 (discussed above) causing traction devices to come to a stop. Halting may include applying brakes and/or powering down machine 12, if desired.

Subsequently, controller 30 may affect back-tracking along the stored historical travel path until the real-time rollover risk value has reached a safe level (e.g., low or moderate). In one aspect, controller 30 may autonomously communicate signals to driving means 26 to responsively control a speed, direction, and/or steering angle of traction devices 22 to affect machine travel (discussed above) in a reverse direction through prior sampled positions in the historical travel path until machine 12 reaches a previously sampled position having a low or moderate rollover risk value. At this point, controller 30 may relinquish control of machine 12 to operator 36. It is to be appreciated that backtracking may include travel in both forward and reverse directions. For example, machine 12 may have been traveling forward prior to halting, in which case it may backtrack along the historical travel path in reverse. Alternatively, machine 12 may have been traveling in reverse prior to halting, in which case it may backtrack along the travel path in forward. It is to be appreciated that controller 30 may also autonomously communicate signals to means 26 to affect movement of implement 18 to a position opposing the direction of inclination. In this manner, rollover risk may be reduced by a change in the machine's center of mass.

Figure 3:
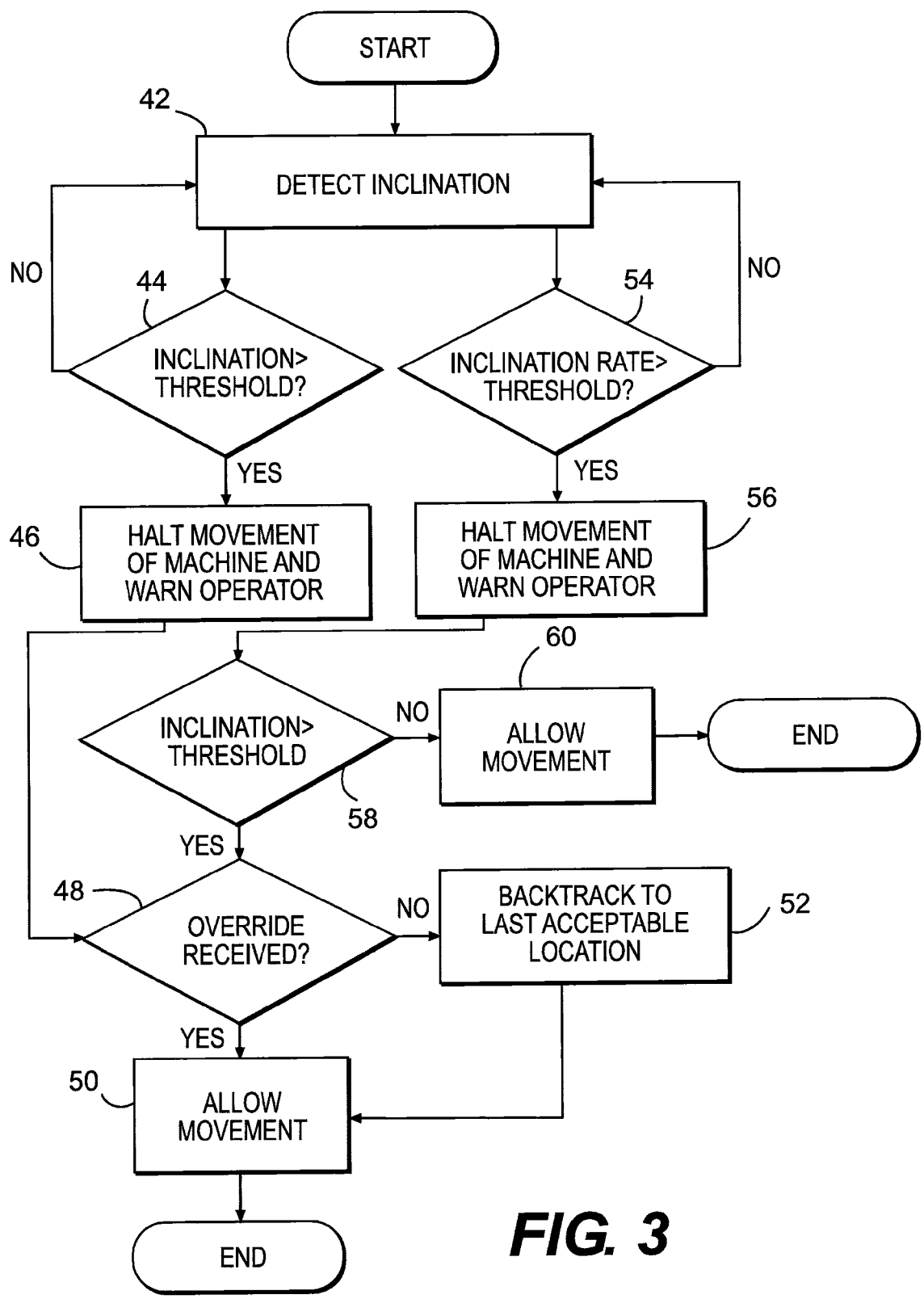
FIG. 3 is a flow chart illustrating an exemplary disclosed method of operating the control system of FIG. 2.

These features will be discussed further in the following section with reference to FIG. 3 to illustrate functionality of the disclosed rollover prevention system.

INDUSTRIAL APPLICABILITY

The disclosed control system may be applicable to any machine encountering steep terrain during travel that could cause the machine to rollover. In particular, the disclosed control system may determine a real-time rollover risk value based on machine inclination, loading, and/or known machine specifications, and warn and/or halt operation of the machine when the risk value reaches a predetermined threshold. The disclosed system may also implement autonomous machine travel along a prior tracked travel path until the rollover risk value reaches a lower level. Operation of control system 16 will now be described.

Although equally applicable to autonomously and manually controlled machines, the rollover prevention algorithm will be described below with respect to a remotely-controlled machine 12. While remotely controlling machine 12 from user interface 34, the rollover protection algorithm 40 shown in FIG. 3 may either be autonomously initiated by controller 30, or manually initiated by operator 36 through interface 34. As operator 36 manipulates interface 34 to affect machine movement about worksite 10, as discussed above, controller 30 may continually receive real-time signals from devices 28a, 28b, indicating a current position, inclination, and/or loading condition of machine 12 (step 42). For example, machine 12 may be a carry dozer traversing a path along level terrain at worksite 10. Controller 30 may sample the signals received from sensing devices 28a, 28b, at certain coordinate locations on worksite 10, indicating no machine inclination (i.e., a pitch angle and roll angle of 0 degrees), and that machine 12 is under 50% of a full capacity carrying load.

Subsequently, controller 30 may determine a real-time machine inclination threshold and compare a current inclination of machine 12 to the threshold (step 44). For example, controller 30 may access the known inclination threshold(s) discussed above (i.e., maximum capacity load threshold, and/or unloaded threshold) and set a real-time inclination threshold by correcting the known threshold(s) to account for the sensed load, as discussed above. Alternatively, controller 30 may compare the current inclination to the known fixed threshold (e.g., 35 degrees roll and 45 degrees pitch). In the example described above, controller 30 may determine that the real time inclination (pitch and roll of 0 degrees) falls within the range assigned to the "low" rollover risk value. As such, controller 30 may then store the current machine position, inclination, and/or rollover risk value in the travel history, and continue to permit unhindered remote control of machine 12 from interface 34. Further, controller 30 may communicate this information, along with other data gathered by data module 28 to user interface 34, which may display, for example, "Pitch: 0 degrees," "Roll: 0 degrees," and "Rollover Risk: Low," for operator confirmation.

During subsequent travel, machine 12 may encounter terrain causing it to roll 20 degrees to the right and maintain a pitch of 0 degrees. Locating device 28a may detect this change in inclination and vary the corresponding real-time signal. Controller 30, upon taking its next sample, may compare the real-time inclination to the threshold (e.g., 35 degrees roll and 45 degrees pitch), and determine that machine inclination currently falls within the range assigned to the "moderate" rollover risk value (step 44). As such, controller 30 may then store the current machine position, inclination, and/or rollover risk value in the travel history, and continue to permit unhindered remote control of machine 12 from interface 34. Further, controller 30 may communicate this information, along with other data gathered by data module 28 to user interface 34, which may display, for example, "Pitch: 0 degrees," "Roll: 30 degrees," and "Rollover Risk: Moderate," for operator confirmation. Further, controller 30 may provide a warning to the operator indicating that the current machine inclination is approaching a high rollover risk. For example, controller 30 may cause interface 34 to display, "Caution! The machine is approaching a moderate incline. Proceed with care."

At another point during travel, machine 12 may encounter steeper terrain causing it to roll 38 degrees to the right and maintain a pitch of 0 degrees. Device 28a may detect this change in inclination and vary the corresponding real-time signal accordingly. Controller 30, upon taking its next sample, may compare the real-time inclination to the threshold (e.g., 35 degrees roll and 45 degrees pitch), and determine that the real-time inclination is greater than the high risk threshold (step 44). In response, controller 30 may immediately and autonomously halt machine travel (step 46), and no longer permit received operator commands from interface 34 to affect machine travel. Additionally, controller 30 may communicate machine position, inclination, rollover risk value, along with other data gathered by data module 28 to interface 34, which may display, for example, "Pitch: 0 degrees," "Roll: 38 degrees," "Rollover Risk: High," and "Machine operation halted," for operator confirmation.

Subsequently, controller 30 may prompt operator 36, by way of interface 34, to override the autonomous halt (step 48)

and relinquish machine control to operator 36. For example, controller 30 may cause interface 34 to display "Warning! The machine has reached a steep incline and is at risk of rolling over. Allow automatic backtracking (Yes/No)?" Operator 36 may choose to continue with manual operation by, for example, pressing a "No" software button provided a display of interface 34, at which point controller 30 may relinquish manual control of machine 12 to operator 36 (step 50). In one aspect, controller 30 may similarly prompt operator 36 multiple times before relinquishing control. In another aspect, controller 30 may first prompt operator 36 to enter a correct username and/or password by way of interface 34 before relinquishing control. The username and/or password may be associated with a user profile having an authority level that may or may not be sufficient to permit continued manual control. For example, controller 30 may verify the authority level and relinquish control only if operator 36 is sufficiently experienced, a system administrator, or the like.

Operator 36 may choose to allow autonomous back tracking by, for example, pressing a "Yes" software button provided on the display of interface 34. Alternatively, controller 30 may command automatic back tracking if the username and/or password entered are incorrect, and/or if the authority level associated therewith is insufficient to allow continued manual control of machine 12. In such a case, controller 30 may autonomously affect back tracking as discussed above (step 52). When machine 12 reaches a previously sampled position having a moderate rollover risk level, controller 30 may again prompt operator 36 to resume manual control or to continue backtracking to a previously sampled position of low rollover risk. For example, controller 30 may cause interface 34 to display, "The machine has reached a moderate incline. Continue backtracking to level terrain (Yes/No)?" If operator selects "No," controller 30 may relinquish manual control to operator 36. If operator 36 selects "Yes," controller 30 may continue autonomous backtracking through the previously sampled positions until a position is reached having a low rollover risk value, at which point controller 30 may automatically relinquish manual control to operator 36.

Concurrently with step 44, controller 30 may also determine if the current machine inclination rate is greater than the high risk inclination rate threshold, as discussed above (step 54). In one aspect, controller 30 may access the known inclination rate threshold and compare the real-time inclination rate thereto. For example, machine 12 may traverse terrain causing it to pitch and/or roll at a rate of 2 degrees/second. Controller 30, upon taking its next sample, may compare this current rate to the known high risk rate threshold of 15 degrees/second. Further, controller 30 may determine that the current inclination rate falls within the range assigned to the "low" rollover risk value. As such, controller 30 may cause interface 34 to display, "Inclination Rate: 2 degrees/second," and "Rollover Risk: Low," in addition to the current pitch and/or roll angles as discussed above.

Subsequently, machine 12 may encounter terrain causing it to pitch and/or roll at a rate of 8 degrees/second. As discussed above, controller 30 may perform a comparison and determine that this current inclination rate falls within the range defined by the "moderate" rollover risk value. As such, controller 30 may cause interface 34 to display, "Inclination rate 10 degrees/second," "Rollover Risk: Moderate," in addition to the current pitch and/or roll angles as discussed above. Further, controller 30 may provide a warning to the operator, such as, "Caution! The machine may be pitching and/or rolling at moderate rate. Please reduce speed and proceed with care."

At yet another point during travel, machine 12 may encounter terrain causing it to pitch and/or roll at a rate of 16 degrees/second. As discussed above, controller 30 may perform a comparison and determine that this inclination rate is greater than the high risk inclination rate threshold. As such, controller 30 may halt machine operation (step 56). Further, controller 30 may cause interface 34 to display, "Warning! The machine has reached an excessive inclination rate. Machine operation has been halted." It is to be appreciated that a moderate inclination angle combined with moderate rate of inclination may together pose a high risk of rollover. In some cases, even a low inclination angle combined with a moderate rate of inclination, or vice versa, may together pose a high risk of rollover. As such, controller 30 may also halt operation in one or more of these cases.

Subsequently, controller 30 may determine if the current machine inclination is greater than the inclination threshold (step 58). In other words, controller 30 may determine if, after inclining at the high rate, machine 12 came to rest at an excessive inclination. It is to be appreciated that the operations performed in this step may be substantially the same as those discussed above in connection with step 44. If controller 30 determines that the current inclination is greater than the threshold, controller 30 may proceed with step 48. Conversely, if controller 30 determines that the current inclination is less than the threshold, controller 30 may relinquish control of machine 12 to the operator and allow movement (step 60). In one aspect, controller 30 may provide a message advising the operator to proceed with caution.

By employing the disclosed automated rollover prevention system and method, an operator controlling a machine from a remote location may have an intuitive feel for the machine's risk of rollover, despite the operator's physical removal from the machine. Additionally, if an excessive incline is encountered, the operator may rely on the disclosed system to backtrack the machine to a known position of low incline, rather than manually attempt to do so and risk damage to the machine, worksite, or nearby structures.

It is to be appreciated that the disclosed rollover prevention algorithm could be implement on manually and/or autonomously controlled machines as well as remotely controlled machines. In the case of a manually controlled machine, the algorithm may be implemented in the same manner discussed above, except that the operator may be onboard controlling machine 12. As such, the operator may receive the rollover warnings and/or inclination information discussed above by way of an interface onboard machine 12. In the case of an autonomously controlled machine where no operator is present, the algorithm may be implemented as discussed above, except that an interface, rollover warnings, and/or inclination information may be unnecessary. That is, it may be unnecessary to convey this information, and controller 30 may simply execute the algorithm internally.

It will be apparent to those skilled in the art that various modifications and variations can be made to the disclosed control system. Other embodiments will be apparent to those skilled in the art from consideration of the specification and practice of the disclosed control system. It is intended that the specification and examples be considered as exemplary only, with a true scope being indicated by the following claims and their equivalents.

What is claimed is:
1. A control system for a machine, comprising:
at least one sensor configured to generate a signal indicative of an inclination of the machine; and
a controller in communication with the at least one sensor and configured to:
stop operation of the machine in response to the inclination signal indicating an excessive incline;
determine a travel path taken by the machine prior to receiving the inclination signal indicating the excessive incline; and autonomously control the machine to backtrack through the travel path.

2. The control system of claim 1, wherein the inclination signal indicates a rate of machine inclination.

3. The control system of claim 1, wherein stopping operation includes halting travel of the machine.

4. The control system of claim 3, wherein the controller is further configured to prevent further travel of the machine until a manual override command is received.

5. The control system of claim 1, wherein the controller is further configured to provide a warning to an operator of the machine when the signal indicates an incline nearing a predetermined threshold.

6. The control system of claim 5, further including a sensor configured to generate a load signal indicative of a loading condition of the machine, wherein the predetermined threshold varies in response to the load signal.

7. The control system of claim 6, wherein the load signal indicates a center of mass of the machine.

8. The control system of claim 1, further including an interface, wherein the machine is remotely controlled by a human operator from the interface.

9. The control system of claim machine of claim 8, wherein the interface is configured to display terrain upon which the machine is located, such that portions of the terrain having a slope greater than a predetermined threshold are visually distinguished.

10. The control system of claim 1, wherein the at least one sensor is configured to detect an incline of the machine in both a travel direction and a direction substantially transverse to the travel direction.

11. A method of reducing machine rollover risk, comprising:
   detecting a machine inclination;
   determining a rollover risk value based on the machine inclination;
   stopping machine operation in response to the rollover risk value;
   determining a travel path of the machine prior to stopping the machine in response to the rollover risk; and
   autonomously reversing operation of the machine according to the tracked movement, until the rollover risk has reduced below a predetermined value.

12. The method of claim 11, further including detecting a machine loading condition, wherein the rollover risk value is based further on the machine loading condition.

13. The method of claim 11, further including preventing further travel of the machine until a manual override command is received.

14. The method of claim 11, further including providing an indication of the rollover risk value to an operator of the machine before stopping the machine operation.

15. The method of claim 11, wherein detecting includes detecting a machine incline angle in both a travel direction of the machine and in a direction substantially transverse to the travel direction.

16. A machine, comprising:
   a power source;
   a traction device driven by the power source to propel the machine;
   a sensor configured to detect machine inclination; and
   a controller in communication with the sensor and the traction device, the controller configured to:
      warn an operator of the machine when the detected inclination falls within a predetermined range;
      stop operation of the traction device in response to the detected inclination exceeding the predetermined range;
      determine a travel path taken by the machine prior to encountering an incline exceeding the predetermined threshold; and
      autonomously control the machine to backtrack through the travel path.

17. The machine of claim 16, further including a load sensor configured to detect a loading condition of the machine, wherein the predetermined range varies in response to the detected loading condition.

18. A method of monitoring machine rollover conditions, comprising:
   detecting a machine inclination;
   determining a rollover risk value based on the machine inclination;
   determining changes in loading of the machine during travel of the machine, including continuously determining changes in a lateral or longitudinal location of a center of gravity of the machine; and
   continuously dynamically updating the rollover risk value based on the continuously determined changes in the lateral or longitudinal location of the center of gravity of the machine.

19. A method of monitoring machine rollover conditions, comprising:
   detecting a machine inclination;
   determining a rollover risk value based on the machine inclination during travel of the machine;
   tracking a location of the machine; and
   generating a map based on the tracked location of the machine that includes indications of at least three levels of the rollover risk value for different tracked locations the machine has traversed.

20. A method of reducing rollover risk of a machine having a braking system, a steering system, and at least one movable machine tool, the method comprising:
   detecting a machine inclination;
   determining a rollover risk value based on the machine inclination during travel of the machine; and
   moving the machine tool in response to the detected machine inclination to reduce the rollover risk value.

21. The method of claim 19, wherein generating a map based on the tracked location of the machine that includes the rollover risk value includes indexing sampled values of the rollover risk value to positions where the sampled values of the rollover risk were acquired.

22. The method of claim 21, further comprising planning navigation of the machine based at least in part on the indexed sampled values of the rollover risk value and the associated positions where those sampled values were acquired.

23. The method of claim 19, further comprising communicating to an operator of the machine a rollover risk associated with at least one position on the map.

24. The method of claim 19, further comprising planning navigation of the machine based at least in part on values of the rollover risk value associated with different positions on the map.

25. The method of claim 20, wherein moving the machine tool in response to the detected machine inclination to reduce the rollover risk value includes moving the machine tool away from a direction of inclination of the machine.

26. The method of claim 20, wherein the machine tool is an excavation implement.

* * * * *